US012780543B2

(12) United States Patent
Razumov et al.

(10) Patent No.: US 12,780,543 B2
(45) Date of Patent: Nov. 3, 2026

(54) SORTING DEVICE

(71) Applicant: MARTISTEL LTD, Limassol (CY)

(72) Inventors: Sergey Razumov, Strovolos (CY); Oleg Sultanov, Moscow (RU)

(73) Assignee: MARTISTEL INNOVATION FZCO, Dubai (AE)

( * ) Notice: Subject to any disclaimer, the term of this patent is extended or adjusted under 35 U.S.C. 154(b) by 402 days.

(21) Appl. No.: 18/285,265

(22) PCT Filed: Apr. 1, 2022

(86) PCT No.: PCT/EP2022/058762

§ 371 (c)(1),
(2) Date: Oct. 2, 2023

(87) PCT Pub. No.: WO2022/207911

PCT Pub. Date: Oct. 6, 2022

(65) Prior Publication Data

US 2024/0182245 A1 Jun. 6, 2024

(30) Foreign Application Priority Data

Apr. 1, 2021 (EP) .................................... 21166762

(51) Int. Cl.
*B65G 1/06* (2006.01)
*B65G 1/04* (2006.01)

(52) U.S. Cl.
CPC ........... *B65G 1/065* (2013.01); *B65G 1/0471* (2013.01)

(58) Field of Classification Search
CPC .... B65G 1/065; B65G 1/0492; B65G 1/0471; B65G 1/1378; B65G 60/00
See application file for complete search history.

(56) References Cited

U.S. PATENT DOCUMENTS 4,687,403 A * 8/1987 Motoda .................. B65G 60/00 414/795.8
2021/0261337 A1* 8/2021 Schedlbauer ........ B65G 1/1378
2022/0267094 A1* 8/2022 Fagerland ............ B65G 1/0485

FOREIGN PATENT DOCUMENTS

DE 29911966 U1 10/1999
DE 2018090081 A1 5/2018
(Continued)

OTHER PUBLICATIONS

ISA/EP, "International Search Report" and English Translation for PCT/EP2022/058762, mailed Aug. 22, 2022.
(Continued)

*Primary Examiner* — Kaitlin S Joerger
(74) *Attorney, Agent, or Firm* — Brett A. Schenck

(57) ABSTRACT

System for storing and organizing materials, comprising:
a storage system, at least a first layer comprising a plurality of storage locations, which are preferably arranged in rows in two horizontal directions perpendicular to one another and serve to receive boxes in stacks, at least one transport device which has a receiving area for individual boxes or stacks of boxes for or from the storage system, a transport system, in particular a rail arrangement, on which the at least one transport device is mounted so that it can be moved to and within the storage system and can be delivered for individual stacking of boxes, and a re-sorting device with at least one gripper, which is connected to the storage system via the transport system and is designed to pick up a subset of boxes or all boxes of a stack of boxes from the transport device, lift them and return them to the transport device or another transport device.

8 Claims, 12 Drawing Sheets

(56) References Cited

FOREIGN PATENT DOCUMENTS

| | | | | | |
|---|---|---|---|---|---|
| JP | H08244973 | A | | 9/1996 | |
| WO | 2014189388 | A1 | | 11/2014 | |
| WO | WO-2016198467 | A1 | * | 12/2016 | ........... B65G 1/0464 |

OTHER PUBLICATIONS

ISA/EP, “Written Opinion of the International Searching Authority” and English Translation for PCT/EP2022/058762, mailed Aug. 22, 2022.

* cited by examiner

SORTING DEVICE

The present invention relates to a re-sorting device according to claim 1.

For a better understanding of the essence of the proposed technical solution, below follows the description of a specific implementation example, which is not a limiting example of the practical implementation of an automatic system for storing materials and collecting sets thereof.

The claimed invention is explained in more detail with reference to the accompanying drawings. Show it:

Figure 8:
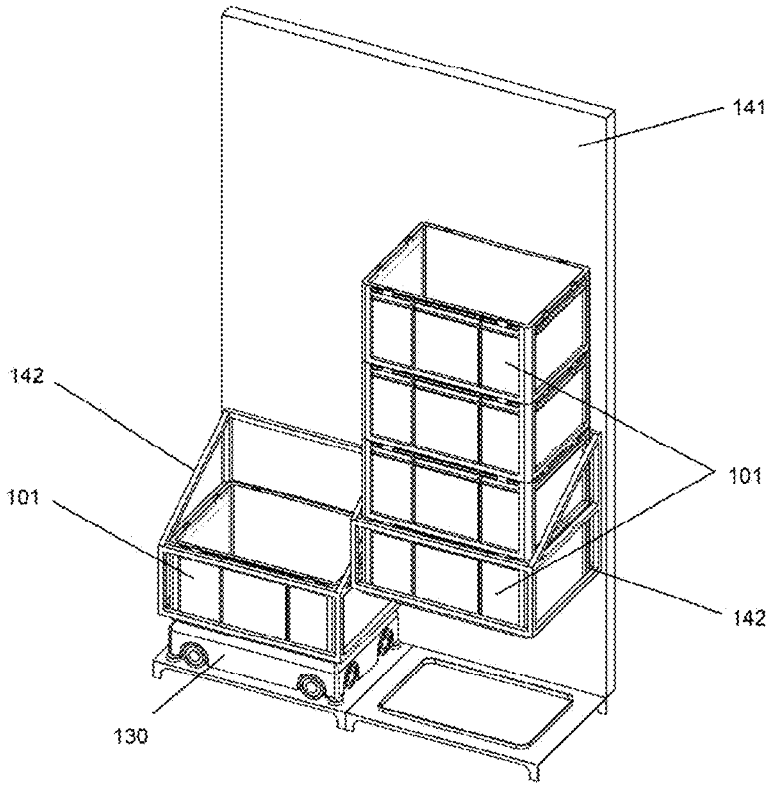
Figure 9:
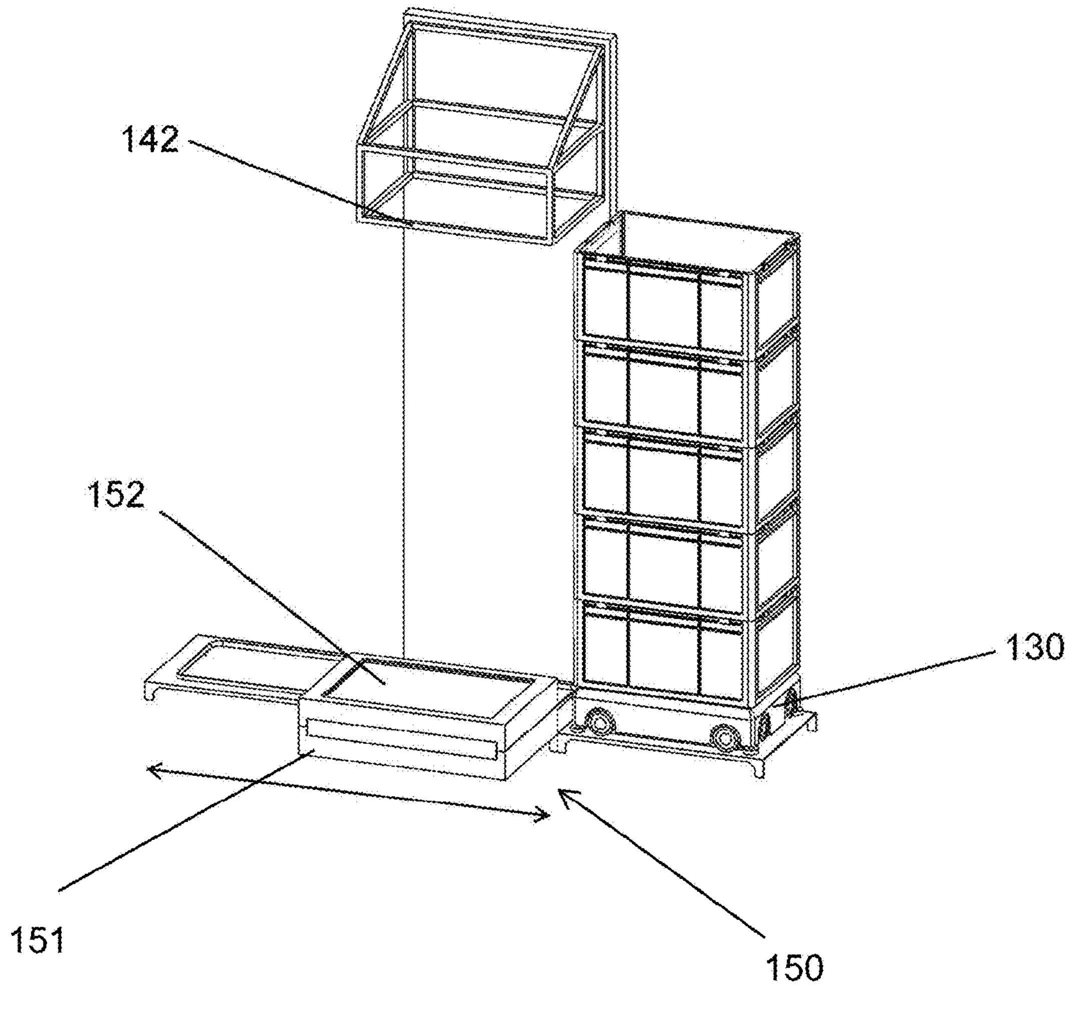
Figure 10:
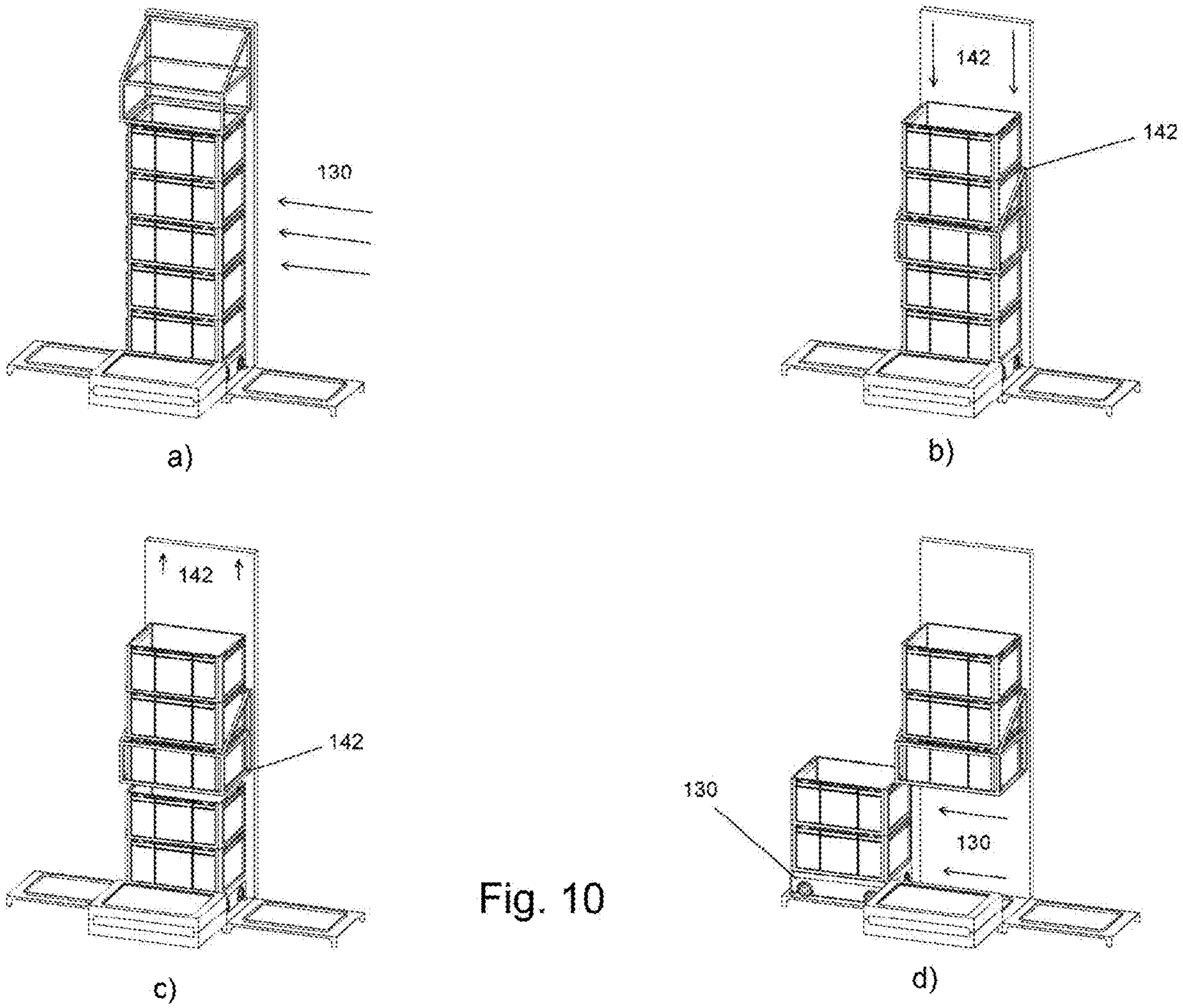
Figure 11:
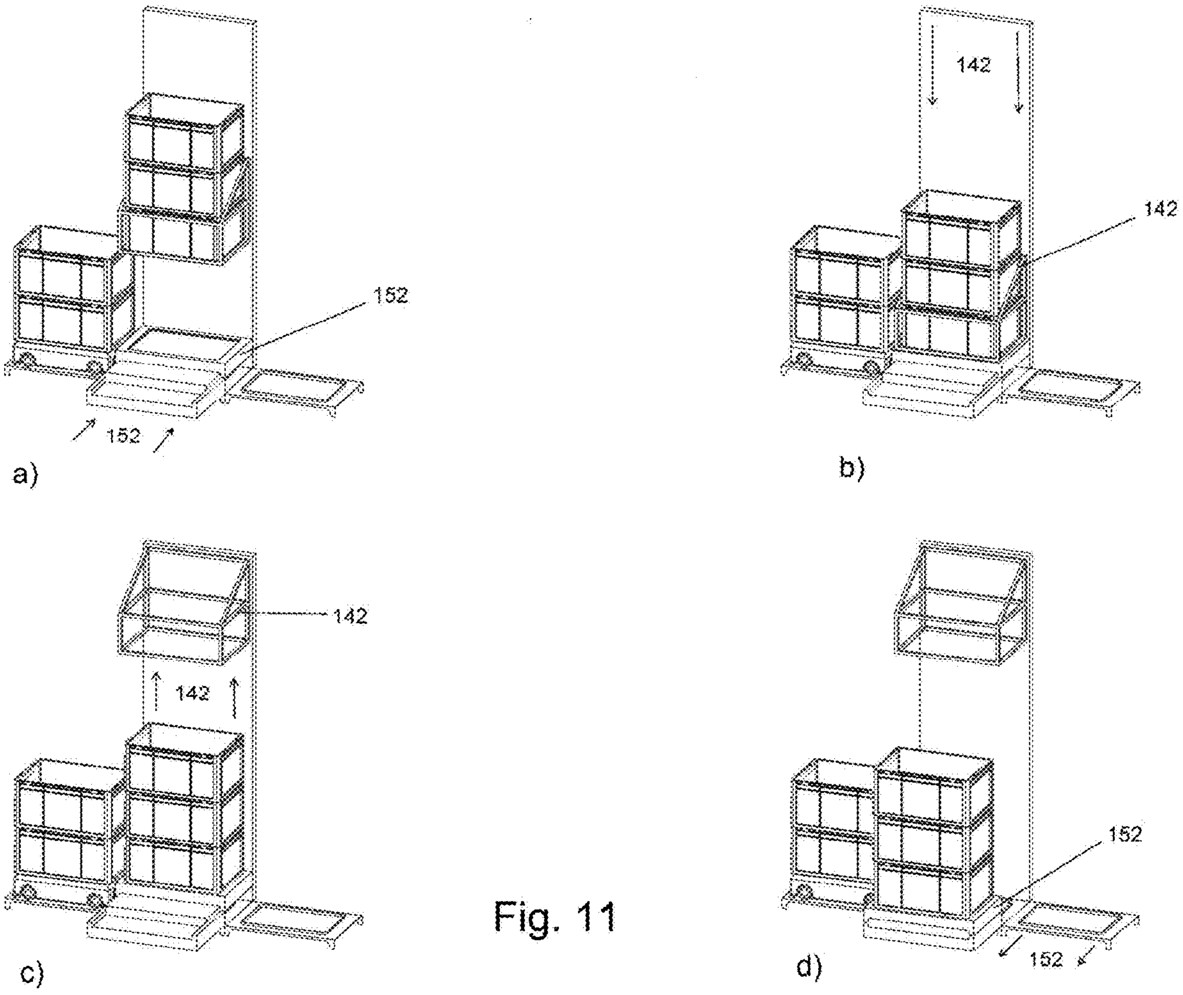
Figure 12:
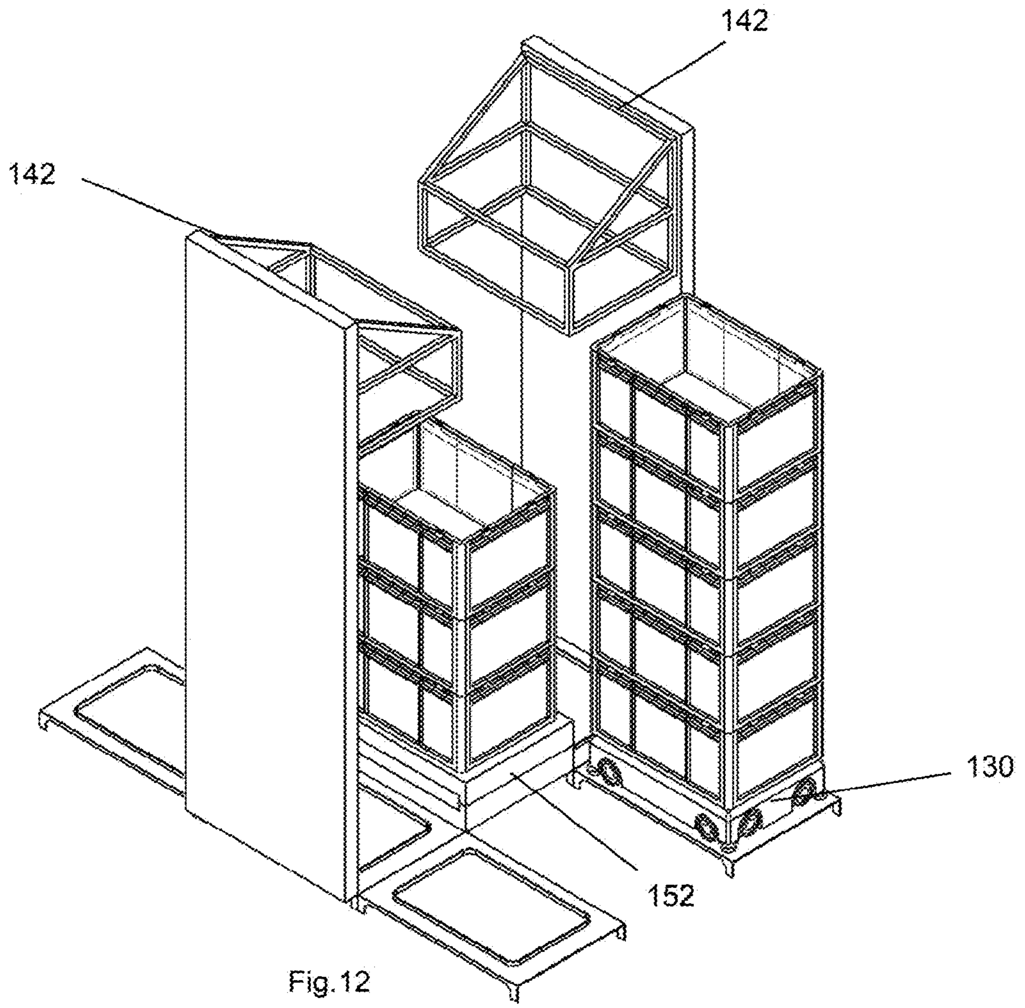

FIG. 8 shows a device for lifting stacks of boxes interacting with stacks of boxes and a mobile transport device, FIGS. 9-11 shows an alternative embodiment with a gripper and a movable storage device, which can replace the second gripper with an advantageous movement sequence and FIG. 12 shows a combination of the first and second embodiments, i.e. with at least one further gripper and at least one movable storage device.

Figure 1:
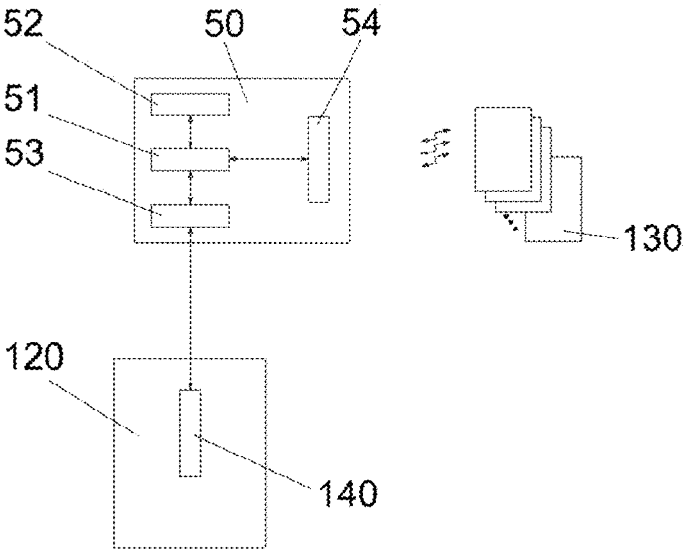
FIG. 1 is a general diagram of an automatic system.
Figure 2:
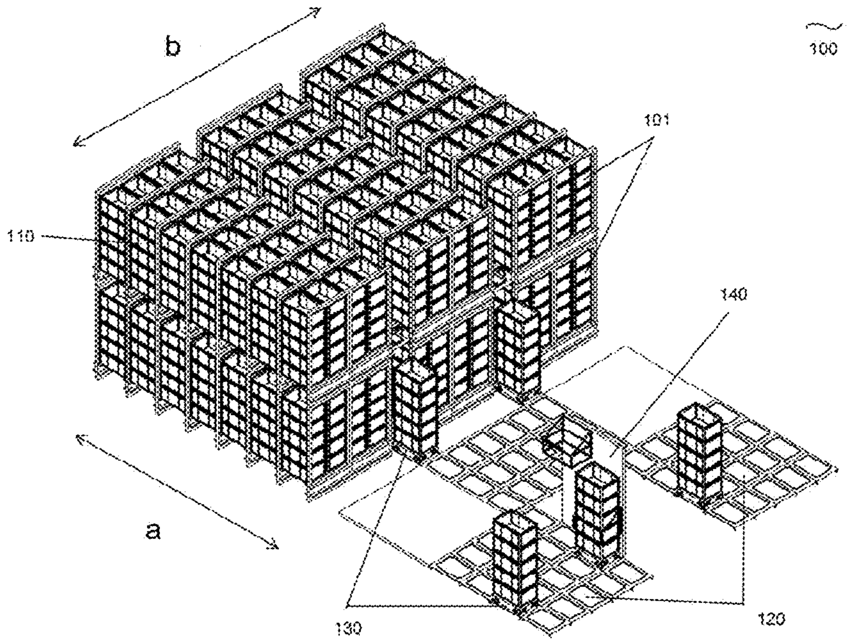
FIG. 2 shows a front perspective view of an automatic system.

As shown in FIGS. 1 and 2, the automatic box storage system and/or the organization system preferably includes a control module 50 and/or a storage system 110 and/or a box sorting area 120. The control module 50 has a central control processor 51 and/or an order processing unit 52 and/or an interface 53 and/or a wireless interface 54, preferably to the mobile transport device 130 and/or a re-sorting device 140.

Multiple mobile transport devices 130 can be controlled by the central processor 51 via the wireless interface 54 and/or are provided, both empty and full boxes as well as stacked boxes 101 (FIG. 5) both within the storage system 110 and (and/or) in the sorting area 120 of the boxes 101 and between the mentioned areas.

As in FIG. 2, at least one, preferably at least two devices for lifting 140/142 stacks of boxes 101 are present in the box/tray sorting area 120. In particular, the re-sorting device 140 can be designed to lift boxes from a mobile transport device, preferably in the sorting area. All boxes as well as a subset of boxes can be lifted or picked up by the re-sorting device. Additionally, the box sorting area 120 may contain multiple buffer locations to accommodate multiple mobile transport devices 130 or their boxes if they arrive early and are awaiting further processing.

The boxes within the storage system 110 are stored in stacks of preferably n boxes one above the other, in a special case n>=5, as shown in the figures.

As in FIG. 2, the storage system 110 of stacked boxes 101 can be designed on several levels with several separate stacks one above the other.

Figure 3:
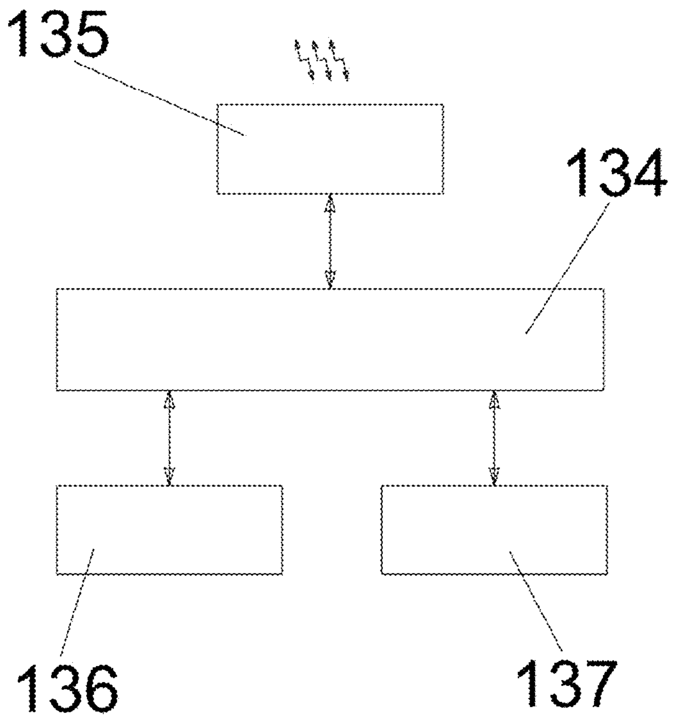
FIG. 3 is a schematic diagram of a mobile transport device.
Figure 4:
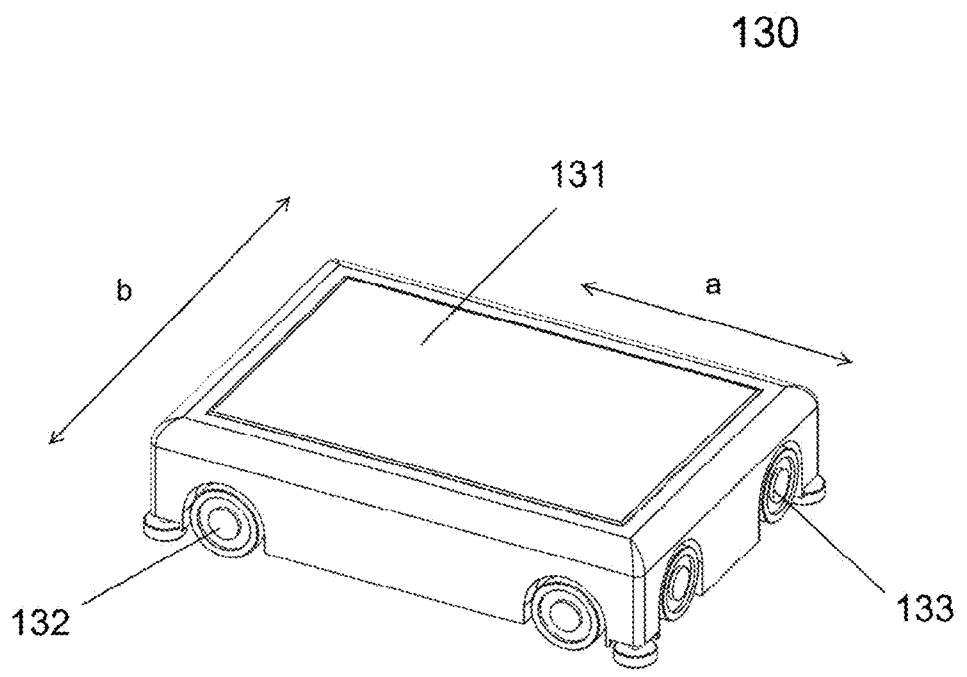
FIG. 4 shows a general view of a mobile transport device.
Figure 5:
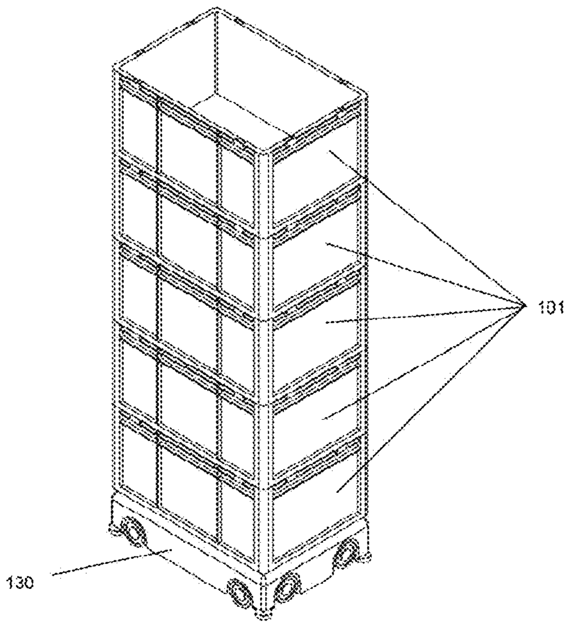
FIG. 5 shows a mobile transport device with a stack of boxes on board.

The mobile transport device 130 shown in FIGS. 3-5 preferably comprises a lifting table 131, which is designed for receiving and transporting boxes 101 or stacking boxes thereof, and two groups of drive wheels 132 and 133, which divide the device into two should move in mutually perpendicular horizontal directions.

The structural design of the mobile transport device 130 or the storage system 110 is manufactured in such a way that an empty mobile transport device 130 with its lifting table 131 without any boxes located/transported on it can be moved freely in the storage area 120 underneath the stacks. This means that the mobile transport device can also be delivered to stacks that are located further back in the storage area, without having to take a detour around the storage area itself.

The mobile transport device 130, which is preferably part of the storage and sorting system according to the invention, can be controlled in any known manner. In particular, an embedded (industrial) controller 134 with a wireless interface 135 for communicating with the central processor 51 of the automatic system can be used for control. The controller 134 controls the drivers 136 of the drives of the wheels 132 and 133 for movement, preferably along rails, in preferably two directions in a plane and/or the driver 137 of the vertical position of the wheels 132, 133, above which the wheels are raised and as a result the underside of the lifting table can touch the floor and/or the state of the lifting table 131 (height adjustability). The rails can be present in the storage system 110 and/or in the sorting area, i.e. also between the areas, and can be provided as a basis for the movement of the mobile transport devices 130.

Figure 6:
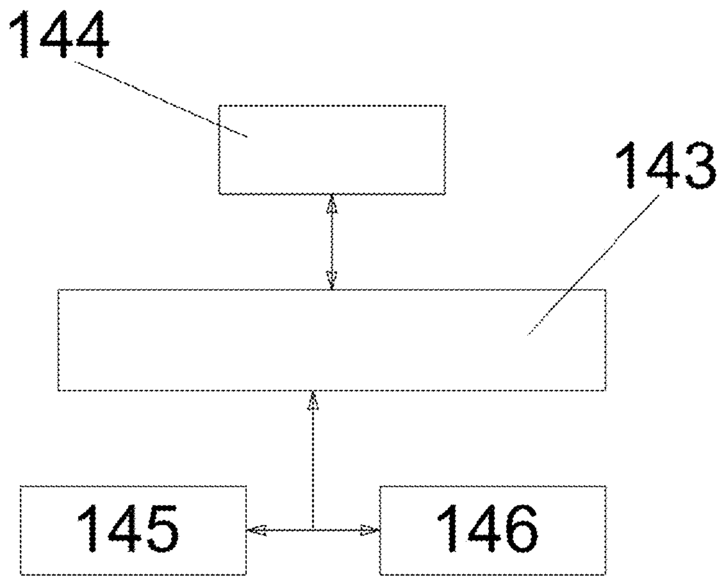
FIG. 6 is a schematic diagram of a device for lifting stacks of boxes.
Figure 7:
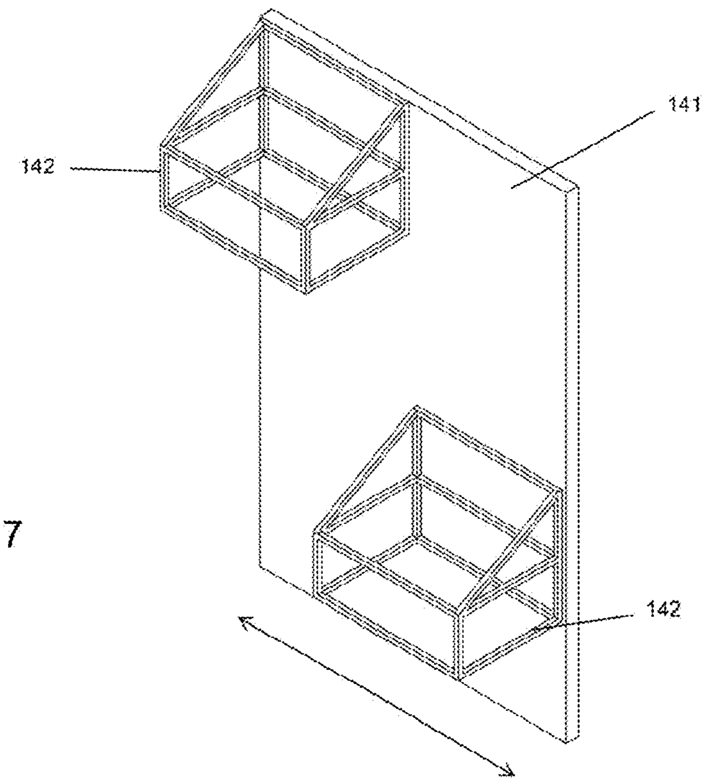
FIG. 7 shows a device for lifting stacks of boxes, general view.

FIGS. 6 to 8 shows a re-sorting device 140 for lifting individual or stacks of boxes with a (base) body 141 and at least two grippers 142 which move in a vertical direction relative to the body 141 and do the gripping/Enable picking up and lifting of any number of boxes 101 from or onto a mobile transport device 130 in the operating range of the grippers 142. The mobile transport device 130 for picking up/grasping the boxes by a gripper is preferably located below the gripper. The gripper can be provided with a frame which is dimensioned so that it can be placed over a stack of boxes. The grippers can be equipped with holding elements/retaining lugs/retaining brackets or other devices which can be delivered to the boxes, which are designed to hold boxes 101 which are placed on the gripper 142 (put over them, see e.g. FIG. 8) to hold.

The resorting device 140 for lifting stacks of trays may also be controlled in any known manner. In particular, an embedded industrial controller 143 may be used, which has an interface 144 for communicating with the central processor 51 of the automatic system 100. The controller 143 preferably controls the drivers 145 and 146 of the respective grippers 142 for picking up and lifting the stack of boxes 101 in the vertical 105 direction.

FIG. 8 shows the interaction of the re-sorting device 140 for lifting stacks of boxes with boxes 101 standing on the mobile transport device 130. As can be seen, the mobile transport device 130 first approaches the first (right) gripper 142 of the re-sorting device 140, the first gripper 142 being selected in the present example, the four upper boxes 101 of the stack standing on the mobile transport device 130, to raise.

Thereafter, the mobile transport device 130 moves in a first horizontal direction under the second (left) gripper 142 of the re-sorting device 140. Then the second gripper 142 lifts the (remaining) box 101 from mobile transport device 130.

The mobile transport device 130 then moves beneath the first gripper 142 of the device 140, whereby the first lifted stack of boxes 101 is placed on the mobile transport device 130. The mobile transport device 130 then moves again beneath the second (correspondingly raised) gripper 142 of the device 140, which now places the previously lower box 101 of the stack on top of the stack.

According to the present invention, the 'systems' described and claimed may be devices.

Alternatively or additionally, it can be provided, instead of a second gripper, to provide a movable storage device 150 in the vicinity of the gripper (FIGS. 9-11). A movable part 152 of the storage device 150, for example a movable shelf or a (slidable/displaceable) conveyor belt, can be deliverable to the gripper 142, whereby the gripper can transfer picked-up boxes to the storage device (e.g. B. place it on this—see FIG. 11*b*).

The movable storage device can have a stationary base 151, on and/or relative to which the movable part 152 of the movable storage device is displaceably mounted.

The movable storage device can then be moved away from the gripper (below the gripper) (FIG. 11*c*,→11*d*), whereby a loading area (below) the gripper, i.e. an area, is released (FIG. 11*d*) in which a mobile transport device 130 can be provided so that the gripper can take over its boxes or deliver them to them, This makes it possible for the gripper, for example, to first take over one or more boxes from a mobile transport device (FIG. 10*b*,→11*c*), then hand them over to the storage device (FIG. 11*a*,→11*b*,→11*c*) and thereby be released for receiving further boxes. If there is an empty mobile transport device next to the movable storage device and/or in the loading area of the gripper, the movable storage device can transfer the temporarily stored boxes (subset) to the mobile transport device again. Alternatively, the storage device can hand the boxes back to the gripper 142 at an appropriate time, which makes it possible to re-sort the boxes of one or more mobile transport devices.

According to the present invention, re-sorting can in particular mean being able to change the order of boxes in an existing stack of boxes using the device according to the invention.

According to the present invention, a stack of boxes is preferably a set of at least two, preferably three, four, five or more boxes arranged one above/on top of the other.

According to the present invention, a subset of boxes of a stack can be at least one box less than is present in the respective stack.

The mobile transport device can then be removed with the subset of boxes for further processing, or the additional boxes picked up by the gripper can be loaded onto the subset. This makes it possible to sort a stack of boxes 101 on a mobile transport device 130 using either at least two grippers 142 or at least one gripper 142 in combination with the movable storage device 150 described above. The present invention relates to a corresponding device and a corresponding method.

In principle, it is also conceivable to provide a combination of the first and second embodiments, as can be seen by way of example in FIG. 12. This allows boxes to be exchanged as in the embodiment of FIGS. 9-11, but also boxes to be exchanged between different mobile transport devices 130 or boxes to be transferred from one mobile transport device to a second.

A possible re-sorting using the embodiment according to FIG. 11 could take place, for example, as follows:

A first mobile transport device 130 is moved into an area below a first of the two grippers 142 shown. This first gripper 142 takes any number of boxes from the mobile transport device 130. The first gripper 142 then transfers the boxes or a subset of boxes to the movable part 152 of the storage device, which can be delivered to this first gripper.

On the other hand, with the second gripper 142, it can now either take over the boxes from the storage device, which is delivered to the second gripper 142, or the gripper is already loaded with boxes, which the gripper puts on the stack of boxes in the storage device, as long as the storage device is delivered to the gripper. The gripper can then in turn lift all of the boxes or a subset of the merged boxes and, after the storage device has been withdrawn from the loading area of the second gripper (along with the remaining boxes, if applicable), the held boxes of the second gripper onto one mobile transfer device 130, which is positioned in the loading area of the second gripper s 142.

This makes it possible to shift between different mobile transport devices 130 and/or change the order of boxes in a mobile transport device 130.

The invention claimed is:

1. A system for storing and organizing materials, comprising:
- a storage system comprising at least one layer including a plurality of storage locations arranged in rows in two horizontal directions perpendicular to one another, each storage location being configured to accommodate a stack of boxes containing the materials;
- at least one transport device configured to transport an individual box or a stack of boxes to and from the storage system;
- a transport system comprising a rail arrangement on which the at least one transport device is movably mounted for movement within the storage system and delivery to individual stacks of boxes; and
- a re-sorting device comprising:
  - a first gripper arranged at a loading area and operatively connected to the storage system via the transport system and configured to selectively pick up, lift, and hold a subset of boxes from a stack of boxes located on the transport device in a lifted position while the transport device is moved relative to a second gripper;
  - the second gripper arranged at the loading area and configured to receive the transport device and to pick up at least one of the remaining boxes from the transport device while the subset of boxes remains held in the lifted position by the first gripper, thereby enabling a modification of a vertical order of boxes in the stack; and
  - a movable storage device arranged adjacent to the loading area and selectively positionable relative to the first gripper and the second gripper, wherein the movable storage device is configured to receive boxes from at least one of the first gripper and the second gripper during a re-sorting operation and temporarily store the received boxes outside of the loading area while the re-sorting operation continues on the stack of boxes.

2. The system of claim 1, wherein the first gripper is height-adjustable and configured to move in both vertical and horizontal directions to access different boxes within the stack.

3. The system of claim 1, wherein the movable storage device comprises a displaceable storage surface configured to be moved between a loading position adjacent to the loading area and a storage position spaced from the loading area.

4. The system of claim 1, wherein at least a portion of the transport system is arranged below at least one of the first gripper and the second gripper and defines the loading area.

5. The system of claim 1, wherein the movable storage device is configured to be selectively delivered to loading areas associated with a plurality of grippers.

6. A re-sorting device for a system for storing and organizing materials, comprising:

a first gripper configured to pick up, lift, and hold a subset of boxes from a stack of boxes supported by a transport device positioned in a loading area;

a second gripper arranged at the loading area and configured to pick up at least one remaining box from the transport device after movement of the transport device relative to the second gripper while the subset of boxes remains held by the first gripper, thereby enabling the return of boxes to the transport device in a different vertical order; and a storage device comprising a movable storage surface configured to move between a loading position adjacent to the loading area and a storage position outside the loading area, wherein the storage device is configured to receive boxes from at least one of the first gripper and the second gripper and to temporarily store the received boxes outside of the loading area while access to the loading area is maintained for continued handling of boxes.

7. The re-sorting device of claim 6, wherein the storage device is arranged between loading areas of the first gripper and the second gripper and is movable toward each of the loading areas.

8. A method for organizing materials, comprising:

transporting a stack of boxes to a loading area using a transport device;

lifting, by a first gripper arranged at the loading area, a subset of boxes from the stack;

holding the subset of boxes in a lifted position by the first gripper;

temporarily storing at least some of the removed boxes on a movable storage device positioned adjacent to the loading area;

moving the transport device relative to the loading area and a second gripper arranged at the loading area while the subset of boxes remains held in the lifted position by the first gripper;

removing, by the second gripper, at least one of the remaining boxes from the transport device; and recombining the subset of boxes and the at least one remaining box on the transport device in a vertical order different than a vertical order before lifting, wherein temporarily storing the removed boxes on the movable storage device enables continued re-sorting of the stack of boxes without blocking the loading area.

* * * * *